United States Patent [19]

Hamblin et al.

[11] 4,272,135
[45] Jun. 9, 1981

[54] SEAL FOR A ROLLING BEARING

[75] Inventors: Ronald F. Hamblin; Harry H. Westgate, both of Luton, England

[73] Assignee: SKF (UK) Limited, Bedfordshire, England

[21] Appl. No.: 86,335

[22] Filed: Oct. 19, 1979

[30] Foreign Application Priority Data

Oct. 23, 1978 [GB] United Kingdom ............... 41569/78

[51] Int. Cl.³ .................... F16C 33/78; F16J 15/34
[52] U.S. Cl. .................................. 308/20; 277/85; 277/38; 308/187.1; 308/36.1; 193/37
[58] Field of Search .................. 277/82, 85, 88, 89, 277/92, 95, 38–43, DIG. 4; 193/37; 308/36.1, 187.1, 187.2, 20

[56] References Cited

U.S. PATENT DOCUMENTS

| | | | |
|---|---|---|---|
| 2,275,307 | 3/1942 | Murden | 277/95 X |
| 2,600,434 | 6/1952 | Saywell | 277/95 |
| 2,888,304 | 5/1959 | Kooistra | 277/95 X |
| 3,097,896 | 7/1963 | Wasley | 277/95 X |

FOREIGN PATENT DOCUMENTS

| | | | |
|---|---|---|---|
| 1123765 | 6/1956 | France | 277/95 |
| 460671 | 2/1937 | United Kingdom | 277/95 |
| 513506 | 10/1939 | United Kingdom | 308/187.1 |
| 693222 | 6/1953 | United Kingdom | 308/187.1 |
| 996057 | 6/1965 | United Kingdom | 277/89 |

Primary Examiner—Robert S. Ward, Jr.
Attorney, Agent, or Firm—Watson, Cole, Grindle & Watson

[57] ABSTRACT

A seal for a rolling bearing has two annular sheet metal members and a resilient sealing element. The two annular members have adjacent axially extending portions which are radially spaced apart to provide an annular axially extending gap. The sealing element is fixed to one annular member, bridges the gap and is in rubbing contact with the other annular member.

6 Claims, 3 Drawing Figures

SEAL FOR A ROLLING BEARING

BACKGROUND OF THE INVENTION (1) Field of the invention

The invention concerns a seal for a rolling bearing. In particular the seal has applications for bearings in a roller for a conveyor belt.

Conveyor belts are used in a variety of industries many of which present environments hostile to bearings; for example, the coal mining industry. In such an industry there is a lot of dust which must be prevented from reaching the bearing and damaging it. Consequently a seal is provided outboard of the bearing in order to protect it.

(2) Description of the prior art

Published U.K. Patent Specification No. 990354 (Hans Ziller) concerns a seal for roller and ball bearings. The seals disclosed in this prior art publication comprise two sheet metal rings and a flexible oil resistant sealing ring, and their construction is such that the metal rings overlap each other radially and provide a complicated path for any foreign particles entering the seal. However this has the disadvantage that the possibility of any foreign particle becoming trapped and causing the seal to jam is increased.

SUMMARY OF THE INVENTION

An object of the invention is to provide a seal for a rolling bearing which is easy to assemble and relatively cheap to manufacture.

The seal has two sheet metal annular members, which are radially spaced apart and form an annular axially extending gap, and a resilient ring bridging the gap. When used for a bearing on a roller for a belt conveyor, the annular gap is raised away from the roller and any buildup of material, for example, dust, on the roller. The resilient ring is on the inside of the seal, that is adjacent to the bearing, and is arranged to prevent loss of lubricant from the bearing and not to allow foreign particles to get wedged in the gap and cause the seal to jam.

The adjacent portions of the two metal annular members defining the annular axially extending gap are preferably flush so that dust and the like is not allowed to build-up and material is allowed to drop straight down.

By off-setting the two metal annular members, the resilient ring which is attached to one of the metal members, is urged into resilient rubbing engagement with the other of the metal members.

With many conveyor belt installations, the rollers are arranged to form a shallow U-shape, with two adjacent rollers lying horizontally and an inclined roller at each end. The invention provides an end shield for the seal to prevent material accumulating on the seal of an inclined roller.

DETAILED DESCRIPTION OF PREFERRED EMBODIMENTS OF THE INVENTION

Figure 1:
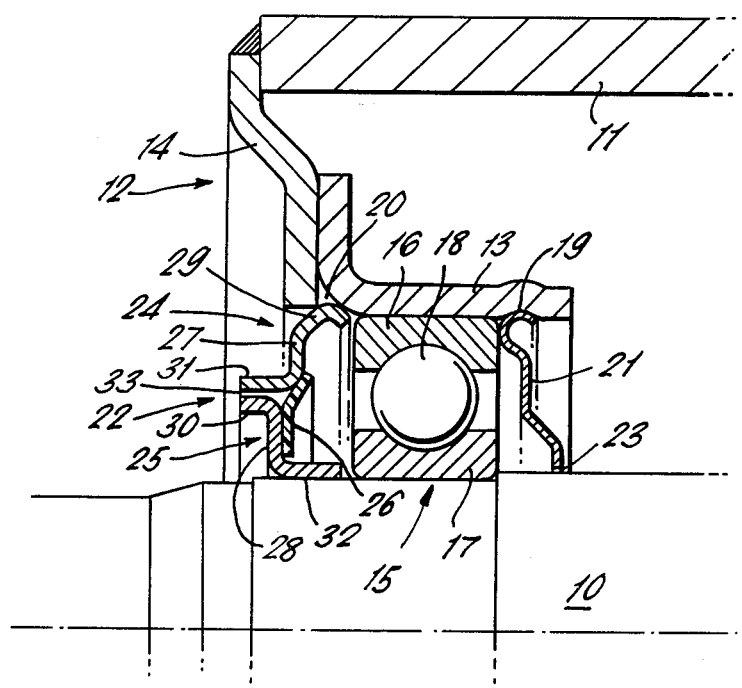
FIG. 1 is part of an axial section of a conveyor roller at one end showing a seal mounted between the spindle and end cap.

Referring to FIG. 1 the conveyor roller shown comprises a shaft or spindle 10, a tube 11 extending co-axially along and around the spindle and an end cap 12 mounted one at each end of the tube. Each end cap 12 is formed from two separately made parts and comprises a sleeve 13 radially spaced from the spindle 10 and an annular flange 14 extending radially outwardly from the sleeve and being fixed, by for example welding, at its radially outer periphery to the tube 11. The sleeves 13 of the two end caps extend from their respective flanges 14 axially inwardly of the tube 11 and towards each other.

A rolling bearing 15, in the embodiment shows a ball bearing comprising an outer race ring 16, an inner race ring 17 and a single annular row of balls 18, is secured between the spindle 10 and the sleeve 13 of the end cap 12 and mounts the tube 11 for rotation about the spindle.

The sleeve 13 of the end cap 12 provides two annular recesses 19 and 20 in its bore locating two seals 21 and 22 respectively one each side of the rolling bearing 15. Seal 21 is a sheet metal ring snapped into recess 19 on the axially inner side of the bearing 15 and forms a narrow annular sealing gap 23 between its radially inner periphery and the surface of the spindle 10.

Seal 22 comprises two sheet metal annular members 24 and 25, annular member 24 surrounding annular member 25, and a sealing element 26. Each annular member 24, 25 comprises an annular disc 27, 28 respectively, a first or radially outer annular portion 29, 30 respectively extending axially from the outer periphery of the disc and a second or radially inner annular portion 31, 32 respectively extending axially in the opposite direction to the first annular portion from the inner periphery of the disc. The first annular portions 29 and 30 of the members 24 and 25 respectively extends in opposite axial directions. First or radially outer annular portion 29 of member 24 is convex in a section plane including the axis and is located in annular recess 20 of end cap 12. Second or radially inner annular portion 32 of member 25 is tubular and is a push-fit onto spindle 10.

The first or radially outer annular portion 30 of radially inner member 25 is spaced radially inwardly from and is adjacent to the second or radially inner annular portion 31 of radially outer member 24 and together portions 30 and 31 define an axially extending annular gap 33 between them with their free ends level with each other. The two annular discs 27 and 28 are axially offset and the sealing element 26, which comprises a ring of resiliently deformable material such as rubber or a plastics, is attached to disc 28 on the side opposite to the level free ends extends across and bridges the said annular gap 33 and is in rubbing contact with member 24. Sealing ring 26 is flat in its relaxed state and, by being attached to member 25 having the axially shorter of the two portions 30 and 31 defining the said annular gap 33, it is in firm contact with member 24. When mounting seal 22, inner member 25 with sealing ring 26 is first pushed onto spindle 10 and then outer member 24 is snapped into position in the recess 20 of end cap 12.

The rolling bearing 15 is packed with grease and seals 21 and 22 prevent loss of grease from the bearing and entry of foreign particles which might damage the bearing. Seal 22 is particularly useful in dusty conditions such as on a conveyor roller used in a coal mine because it removes the sealing gap from the spindle 10 and allows a certain amount of dust to build up on the spindle before it reaches the said annular gap 33. Dust particles which do enter the said annular gap 33 are prevented passing, by sealing element 26 into the grease and bearing 16.

Figure 2:
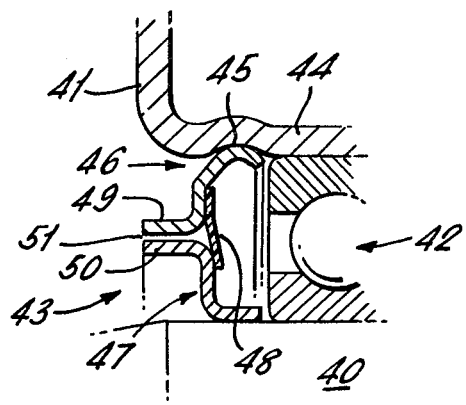
FIG. 2 is part of an axial section of a conveyor roller at one end with a different seal mounted between the spindle and end cap.

The conveyor roller shown in FIG. 2 is very similar to that shown in FIG. 1 in comprising a spindle 40, an end cap 41, a rolling bearing 42 and a seal 43. End cap 41 is made in one piece and has a sleeve 44 which provides an annular recess 45 in its bore for seal 43. Seal 43 comprises two sheet metal annular member 46 and 47, member 46 surrounding member 47, and a sealing element 48. Member 46 has a radially inner axially extending annular portion 49 and member 47 has a radially outer axially extending annular portion 50, and the two portions 49 and 50 together define an axially extending annular gap 51 between them. Since portion 49 is axially shorter than portion 50 with their free ends level, sealing element 48 is attached to member 46, extends across and bridges the annular gap 51 and is in rubbing contact with member 47. The feature that the annular sheet metal member to which is attached the sealing element is axially located in a recess is preferred because that member is mounted first and allows the other member to be mounted and adjusted to fit in the same operation.

Figure 3:
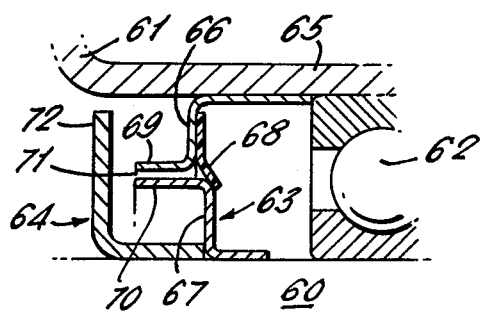
FIG. 3 is part of an axial section of a conveyor roller at one end with another seal mounted between the spindle and end cap and a baffle mounted on the spindle adjacent to the seal.

The part of the conveyor roller shown in FIG. 3 comprises a spindle 60, an end cap 61, a rolling bearing 62, a seal 63 and a shield 64. The end cap 61 is made in one piece and has a sleeve 65 having no recesses to locate seal 63. Seal 63 comprises two sheet metal annular members 66 and 67, member 66 surrounding member 67, and a sealing element 68 attached to member 66. Outer member 66 is a push-fit in the bore of the sleeve 65. The two members 66 and 67 provide two axially extending annular portions 69 and 70 respectively defining an annular axially extending gap 71.

The shield 64 is mounted on the spindle 60 on the opposite side of the axially outermost seal, that is seal 63, to the bearing 62 and has an annular flange 72 extending radially outwardly past the two portions 69 and 70 of the seal 63 defining the axially extending annular gap 71. Such a shield 64 may prove useful when using a roller having such a seal 63 in dusty conditions since dust particles will initially build-up on the spindle 60 on the axially outer side of the flange 72. Care has to be exercised however in case dust particles are trapped between the seal 63 and shield 64 and are allowed to build-up and reach annular gap 71. The shield 64 is usually made from a heavier gauge of sheet metal than the components 69, 70 of seal 63 and gives the seal 63 protection against damage from impinging material.

Although the seal 22, 43, 63 has been described in connection to a conveyor roller it can equally be used to seal a rolling bearing mounted on a shaft in some other form of housing. Instead of having a sealing element comprising a flat ring 26, 48, 68 which is strained to achieve a firm rubbing contact by the annular discs of the two members being axially offset, a sealing element may be formed having a flat annular portion and a conically extending portion. Then the annular discs of the two members can be located on the same plane lying normal to the axis with the sealing element distorted to a flat shape for firm rubbing contact.

Although the seal 22, 43, 63, described and shown has two annular members which are in axial section basically an S or Z shape, the S or Z shape can be more pronounced so that the annular disc extends conically. Also other basic shapes are possible, for example a C or U shape, with the radially outer and inner annular portions of each member extending in the axial direction and being joined together by an annular disc. Instead of using a rubber or plastics ring as the sealing element 26, 48, 68 nylon flock may be attached to the annular axially extending surface of one of the two annular axially extending portions defining the said annular gap 33, 51, 71 which surface is radially opposed to the other of the two portions. The nylon flock will extend radially and be in rubbing contact with the said other of the two portions defining the gap and prevent the entry of dust particles.

All the components of the seal can be made of plastics as well as same being made of sheet metal.

We claim:

1. A seal for a rolling bearing comprising two sheet metal annular members one surrounding the other, and a resiliently deformable sealing element, each annular member comprising an annular radially extending disc having a radially outer periphery and a radially inner periphery, a first annular portion extending axially from the radially outer periphery of the disc and a second annular portion extending axially from the radially inner periphery of the disc, the first annular portion of the radially outer annular member being adapted to be secured in the bore of a housing, the second annular portion of the radially inner annular member being adapted to be mounted on a shaft, the first annular portion of the radially inner member being spaced radially inwardly from and being adjacent to the second annular portion of the radially outer member to define an axially extending annular gap between the two said adjacent portions, and the sealing element being attached to one annular member, extending across and bridging the said annular gap and being in rubbing contact with the other annular member.

2. A seal as claimed in claim 1, wherein the first and second annular portions of each annular member extend in opposite axial directions from the annular disc, the first annular portions of the two annular members extend in opposite axial directions and the free ends of the two said adjacent portions are level, each annular disc having opposed axially facing sides and the sealing element comprising a ring attached to the axially facing side of the annular disc of one annular member opposite to the said level free ends.

3. A seal as claimed in claim 2, wherein the annular discs of the two members are axially offset and the sealing element is secured to the member having the shorter of the two said adjacent annular portions defining the annular gap.

4. A seal as claimed in any one of the preceding claims wherein the first annular portion of the radially outer member is rotationally symmetrical about an axis and is convex in a section plane including the axis for location in an annular recess in the bore of a housing.

5. A conveyor roller comprising a spindle, a tube having two opposite ends and extending co-axially along and around the spindle, two end caps one fixed at each end of the tube, each end cap comprising an annular flange having a radially inner periphery and a radially outer periphery and which is fixed at its radially outer periphery to the tube and a sleeve which extends from the radially inner periphery of the flange and is radially spaced from the spindle, the sleeves extending from their respective flanges axially towards each other, rolling bearings secured one between the spindle and the sleeve of each end cap and mounting the tube for rotation around the spindle, and a seal as claimed in claim 1, 2 or 3 located one between the sleeve of each end cap and the spindle on the axially outermost side of and adjacent to the bearing with the sealing element innermost.

6. A conveyor roller as claimed in claim 5 including a shield mounted one at each end of the tube on the spindle and on the opposite side of the axially outermost seal to the bearing and having an annular flange extending radially outwardly past the two said portions of the seal defining the axially extending annular gap.

* * * * *